UNITED STATES PATENT OFFICE.

THEODORE E. O. ALLAIRE, OF PARIS, FRANCE.

IMPROVEMENT IN PURIFYING SACCHARINE JUICES.

Specification forming part of Letters Patent No. 127,447, dated June 4, 1872.

Specification describing a new and useful Improvement in Purifying Saccharine Juices, invented by THEODORE ÉMILE OCTAVE ALLAIRE, of Paris, France.

My invention consists in purifying sugar and all kinds of saccharine juices, and in extracting nearly all the crystallizable sugar therein contained, by means of the hydrofluosilicate of ammonia, or the double fluoride of silicium and ammonium, or other double fluoride containing silicium, whereby more or less insoluble precipitates are formed, whose presence in the saccharine juices would have prevented the crystallization of a certain quantity of sugar.

The following is one method of carrying the first part of the operation into effect: After the saccharine juices have been brought to a proper density, I add to such juices as intimately as possible a quantity of hydrofluosilicate of ammonia, or double fluoride of silicium and ammonium, or other equivalent, proportionate to the quantity of bases in the salts contained in the sugar or saccharine juices under treatment. This first operation should be carried on at a low temperature.

The precipitate thus formed can be collected either at the bottom of the apparatus after decantation, or on the filters, after filtration. This operation is repeated as long as any precipitate is formed.

The second operation consists in saturating and precipitating, preferably by means of cream of lime, the excess of the double fluoride of silicium and ammonium as well as the mineral and organic acids which the saccharine juices contained after the first operation, and thus to neutralize more or less completely the juices. This second operation is ordinarily carried on at a temperature of about 120° to 150° Fahrenheit.

The object of the cream of lime in this operation is two-fold; first, to form an insoluble fluoride in the saccharine juices containing said double fluoride, by precipitating the silicium and setting free the ammonia. Second, to act on the salts, the organic or mineral acids, and organic matter generally, substantially in the manner observed in the ordinary defecation of saccharine juices. In place of the cream of lime other equivalent substance such as baryta can be used, which will form insoluble fluorides instead of the soluble fluorides.

After repeating the precipitations until nearly all the salts are removed, the remaining part of the operation is the same as that in ordinary use for clarifying sirups, or for obtaining crystallized sugar.

The intimate mixture of the substances employed in my first and second operations, can be produced by any mechanical means.

As in the first, the second operation is not terminated until a precipitate is no longer formed, which may consequently require several repetitions of the same process.

During these successive operations the precipitates become mixed on the bottom of the vessels, or on the filters, with a considerable quantity of organic substances which interfere with a perfect crystallization of the sugar, or clarification of saccharine juices.

The third part of my invention consists in recovering nearly all the double fluorides from the precipitates already mentioned, as formed in the two operations for the purification of sugar and saccharine juices.

The precipitates from the first operation are especially treated with water, then subjected to pressure, dried, pulverized, and mixed with an ammoniacal salt, (I prefer the chloride of ammonium,) proportioned to the variable amounts of saline matters contained in the sugar or juices in the substances treated as determined in each case by analysis, and finally sublimated at a temperature from 680° to 780° Fahrenheit.

The sublimate thus produced is the double fluoride of silicium and ammonium, or the hydrofluosilicate of ammonia, if that salt was originally employed.

It is advisable to wash the sublimate with methylic alcohol to dissolve foreign matters, which may also have been sublimated. By these means the hydrofluosilicate or double fluoride above named, may be indefinitely reproduced, with no loss, excepting that which invariably attends industrial and chemical manipulations.

The fourth feature of my invention consists in the treatment of the precipitates from the second operation in purifying sugar and saccharine juices to recover the fluoride of silicium (if that fluoride has been employed,) and is as follows: The silica and the fluoride of calcium resulting from the treatment of the saccharine juices by lime, with perhaps an additional quantity of other fluoride of calcium, is mixed with sand in proper chemical proportions for producing the fluoride of silicium, and with the usual addition of sulphuric acid or of any other substance ordinarily employed in such connection, and after intimate mixture thrown into a furnace of cast-iron, suitably placed over a fire. On the application of heat the fluoride of silicium is made to ascend through a large flue constructed of bricks, to a chamber where pieces of canvas are suspended vertically, and continually moistened with small streams of water. After being forced to circulate several times around and in contact with these sheets of moistened canvas, the undecomposed fluoride of silicium is conducted to a second chamber, where entire decomposition of this residue is accomplished by jets of steam. The current from the furnace may be established by means of a chimney, in which jets of wet steam may be introduced to facilitate the movement of the gases, and to insure contact of the fluoride of silicium with water. The silica resulting from the decomposition falls to the bottom of the chambers, while the hydrofluosilicic acid is dissolved by the water and condenses on the sides of said chambers and on the sheets of moistened canvas, and is caused to flow into suitable vessels. The hydrofluosilicic acid thus obtained is concentrated as much as possible, and a small stream of methylic alcohol mixed with ammonia is made to flow slowly into the acid solution. This produces the double fluoride of ammonium and silicium, which is precipitated, owing to its insolubility in alcohol.

The complete saturation of the acid should not be accomplished, lest the double fluoride produced should be decomposed. The precipitated fluorides are separated by filtration, and the mixture of ammonia and methylic alcohol is added to the filtered liquid. This may be repeated several times to avoid decomposing the double fluoride already formed.

The fifth part of my invention is the employment of a silicious coating or cement for protecting the furnace and the refractory or other bricks employed in constructing the chambers referred to, and the chimney, &c., against chemical action during the operations.

What I claim as my invention, and desire to secure by Letters Patent, is—

1. The method herein described, of purifying sugar and saccharine juices, by the use of the hydrofluosilicate of ammonia or the double fluoride of silicium and ammonium, or other double fluoride containing silicium, substantially as specified.

2. The combination of the double fluoride and the cream of lime, or their respective equivalents herein named with each other, for the purpose specified, namely, to form an insoluble, instead of a soluble, fluoride.

3. Utilizing the precipitates of the first operation, so as to reproduce the double fluoride of silicium and ammonium.

4. The method of utilizing the residues proceeding from the second operation in the saccharine juices, to reproduce the fluoride of silicium, substantially as specified.

5. The apparatus used for preparing the fluoride of silicium, or the hydrofluosilicic acid, lined in the interior, as specified.

THEODORE EMILE OCTAVE ALLAIRE.

Witnesses:
EMILE DUHAN,
CHARLES DEHOS.